United States Patent [19]

Okamoto et al.

[11] Patent Number: 5,493,155

[45] Date of Patent: Feb. 20, 1996

[54] ELECTRIC POWER SUPPLY SYSTEM

[75] Inventors: Mitsuo Okamoto, Yamatotakada; Hirokazu Kodama, Goze; Tsukasa Takebayashi, Yamatotakada; Kouji Minamino, Fujiidera; Yoshikazu Tsuyuguchi, Sakai; Shigeru Ohmori, Amagasaki, all of Japan

[73] Assignees: Sharp Kabushiki Kaisha; The Kansai Electric Power Co., Inc., Osaka, Japan

[21] Appl. No.: 351,048

[22] Filed: Nov. 28, 1994

Related U.S. Application Data

[63] Continuation of Ser. No. 870,891, Apr. 20, 1992, abandoned.

[30] Foreign Application Priority Data

Apr. 22, 1991 [JP] Japan ................. 3-90572
Apr. 10, 1992 [JP] Japan ................. 4-90963

[51] Int. Cl.$^6$ ........................... H02J 9/00; H02M 1/10
[52] U.S. Cl. ........................ 307/45; 307/64; 307/66; 323/906; 323/299; 323/311
[58] Field of Search .................... 307/46, 45, 64, 307/66, 113, 125, 135; 323/906, 282, 283, 284, 285, 299, 311

[56] References Cited

U.S. PATENT DOCUMENTS

| | | | |
|---|---|---|---|
| 4,750,099 | 6/1988 | Inoue et al. | 323/906 |
| 4,750,102 | 6/1988 | Yamano et al. | 323/906 |
| 4,785,226 | 11/1988 | Fujisawa et al. | 323/271 |
| 4,794,272 | 12/1988 | Bavaro et al. | 307/66 |
| 5,034,871 | 7/1991 | Okamoto et al. | 363/15 |

OTHER PUBLICATIONS

"Technical Digest of the International PVSEC–5" Kyoto, Japan 1990.

*Primary Examiner*—William M. Shoop, Jr.
*Assistant Examiner*—Peter Ganjoo

[57] ABSTRACT

This electric power supply system includes an air conditioner serving as load, a solar photovoltaic cell for supplying power to the air conditioner, and a system power control circuit and further including a commercial power source for use in combination with the solar photovoltaic cell for supplying additional power when insufficient, power is supplied from the solar photovoltaic cell to the air conditioner. In an operation state of the air conditioner, the system power control circuit operates to regulate an operating point of the solar photovoltaic cell and variably regulate the supplied power from the solar photovoltaic cell while comparing required power of the air conditioner with the supplied power from the solar photovoltaic cell.

11 Claims, 15 Drawing Sheets

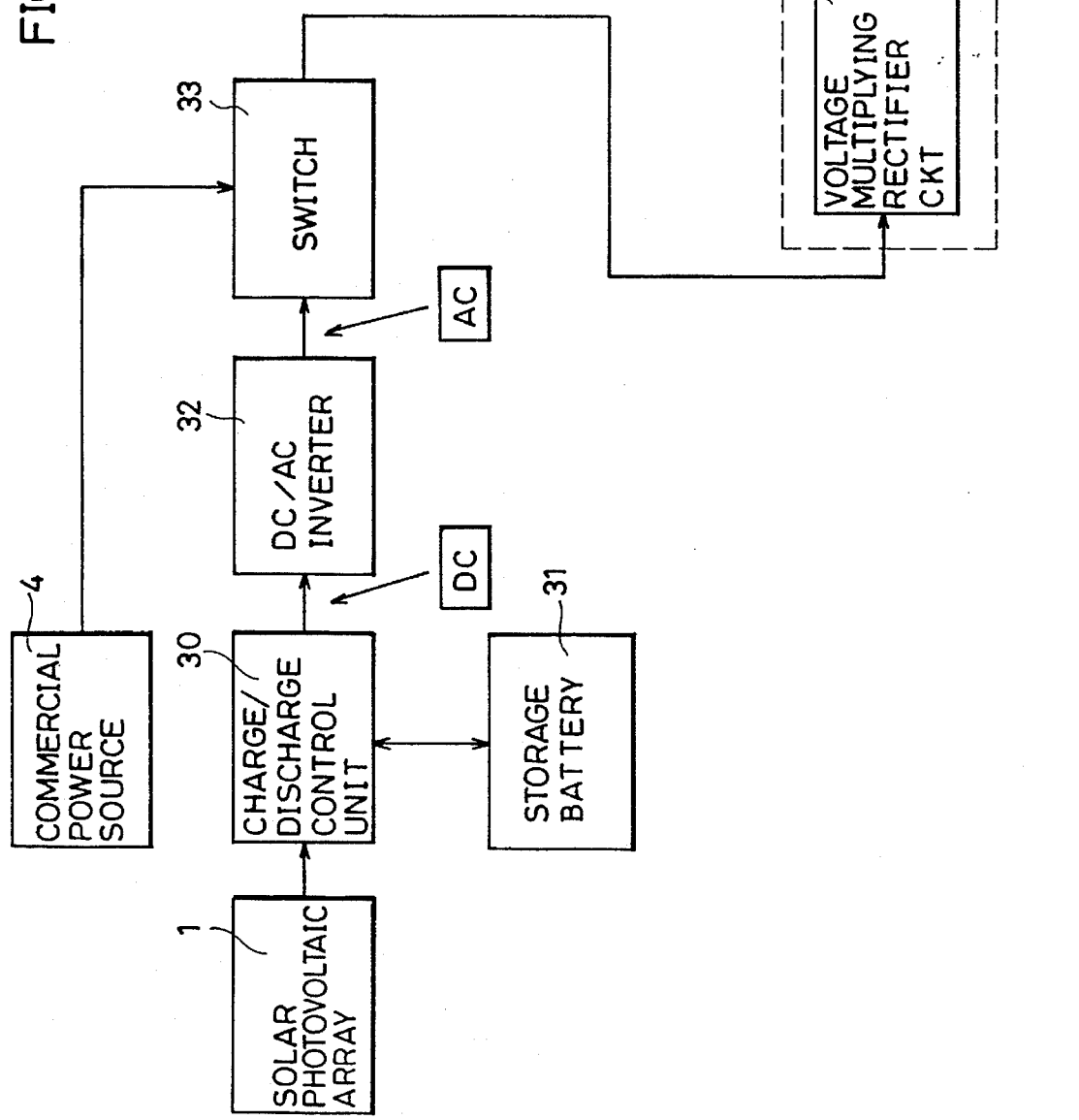

ELECTRIC POWER SUPPLY SYSTEM

This application is a continuation, of application Ser. No. 07/870,891, filed on Apr. 20, 1992, now abandoned.

BACKGROUND OF THE INVENTION

1. Field of the Invention

The present invention relates to electric power supply systems and, more particularly, to an electric power supply system which includes a commercial power source and another power source and in which power is supplied to load by employing those two power sources in combination.

2. Description of the Background Art

Conventionally, non-utility generators or the like have been used in place of commercial electric power in factories or the like in order to reduce concentrated demands for commercial electric power due to a concentrated use of coolers in the daytime, especially the summer time. Recently, solar photovoltaic cells which have been recently developed have also been used as one of countermeasures for the reduction of concentrated demands for commercial power. Further, a system has been developed in which a solar photovoltaic cell and a commercial power source are used in combination by effectively using characteristics of the solar photovoltaic cell that generates power only in the daytime.

FIG. 13 is a schematic diagram showing structure of a conventional typical solar photovoltaic cell utilizing system in combination with a commercial power source.

With reference to FIG. 13, this system includes a solar photovoltaic array 1, a commercial power source 4, a charge/discharge control unit 30, a storage battery 31, a DC/AC inverter 32 for converting an applied direct current (DC) voltage into an alternating current (AC) voltage and outputting the converted voltage, a switch 33, an air conditioner 34 being the load of the system, as well as a lighting unit 35, a refrigerator 36 and the like.

A DC voltage output from solar photovoltaic array 1 is applied via charge/discharge control unit 30 and storage battery 31 to DC/AC inverter 32. The applied voltage is then converted into an AC voltage of a predetermined level by DC/AC inverter 32 and then applied to switch 33 at a succeeding stage. Switch 33 is also supplied with a voltage of 100 V (AC) from commercial power source 4 connected on the other side. Switch 33 has its signal input changed over to either DC/AC inverter 32 or commercial power source 4 and operates to provide a voltage applied to the changed-over input to its output. Accordingly, load registered in the system is supplied with power necessary for driving of the load from either the solar photovoltaic array 1 or the commercial power source 4. Switch 33 is provided to avoid a mixture of AC voltages.

Charge/discharge control unit 30 and storage battery 31 are provided in association with solar photovoltaic array 1 to inhibit output variations of solar photovoltaic array 1. More specifically, when an output of solar photovoltaic array 1 is larger than the power required by load because of sufficient insolation, the output of solar photovoltaic array 1 is supplied to the load and excess power is stored in storage battery 31. Conversely, in cloudy days or rainy days, since power is insufficient to drive the load by utilizing only the output of solar photovoltaic array 1, the deficiency in power is replenished by storage battery 31 through charge/discharge control unit 30. Accordingly, charge/discharge control unit 30 and storage battery 31 serve to inhibit output variations of solar photovoltaic array 1 in accordance with sunshine conditions, so as to obtain sufficient power to stably drive the load. If the above-described commercial power source-combined type solar photovoltaic cell utilizing system of FIG. 13 is adopted, the concentrated demands for power with respect to commercial power source 4 can be reduced.

However, since the aforementioned solar photovoltaic cell utilizing system shown in FIG. 13 requires charge/discharge control unit 30 and storage battery 31 in association with solar photovoltaic array 1, the initial cost for provision of the system is increased. This results in a problem that it is difficult to make the system come into wide use.

FIG. 14 is a diagram for use in explaining a procedure of energy conversion in a case where power is supplied to an inverter air conditioner in the commercial power source-combined type solar photovoltaic cell utilizing system shown in FIG. 13.

There has been a further disadvantage that a utilization efficiency of energy is low in a case where air conditioner 34 is driven by utilizing solar photovoltaic array 1 as shown in FIG. 14. That is to say, air conditioner 34 includes a compressor 7. Since air conditioner 34 drives compressor 7 to circulate a refrigerant for heat exchange, a voltage multiplying rectifier circuit 5 and a VVVF (Variable Voltage Variable Frequency) inverter 6 are newly provided for supplying AC power for driving compressor 7 to compressor 7. Accordingly when air conditioner 34 is driven by utilizing solar photovoltaic array 1, DC power output from solar photovoltaic array 1 is once converted into the same AC power as commercial power and further undergoes electric power conversion for driving compressor 7 in air conditioner 34, resulting in a problem that energy loss cannot be avoided in double power conversion.

SUMMARY OF THE INVENTION

One object of the present invention is to provide an electric power supply system which can come into wide use by reducing cost for use in installation of the system.

Another object of the present invention is to provide an electric power supply system having a higher power utilization efficiency.

In order to accomplish the foregoing objects, an electric power supply system includes a first power source for supplying power to load, and a second power source for use in combination with the first power source for supplying deficient power of power supplied from the first power source, to load.

The first power source includes a power source unit therein. Output power of the power source unit is regulated by variable setting of an operating point of the unit. The variable setting of the operating point is carried out in response to results of a comparison between the output power of the power source unit and required power of load. Accordingly, the variable setting of the operating point enables power to be stably supplied from the power source unit to the load. Further, a storage battery, a charge/discharge control unit and the like provided for correcting output variations of the power source unit are unnecessary, resulting in a reduction in cost for provision of the system. In addition, since the output power of the power source unit is directly supplied to the load without being subjected to AC/DC (DC/AC) conversion, efficient power supply is achieved without any power loss caused by the conversion.

BRIEF DESCRIPTION OF THE DRAWINGS

FIG. 14 is a diagram for use in explaining an energy conversion procedure when power is supplied to an inverter air conditioner in the solar photovoltaic cell utilization system shown in FIG. 13.

DESCRIPTION OF THE PREFERRED EMBODIMENTS

First to fourth embodiments of the present invention will now be described in detail with reference to the drawings.

While an electric power supply system according to each embodiment employs an air conditioner as the load, this type of load is not limited to the air conditioner but may be for example, a refrigerator, a washing machine and the like.

Figure 1A:
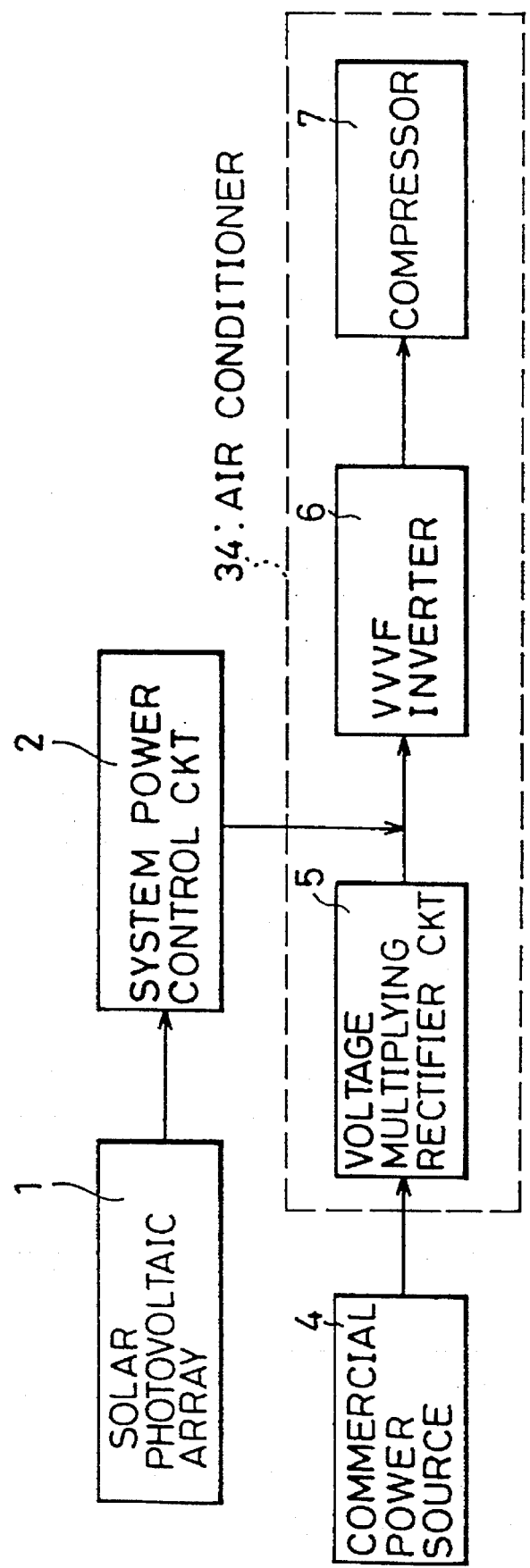
FIGS. 1A and 1B are diagrams showing structure of an electric power supply system according to a first embodiment of the present invention.
Figure 1B:
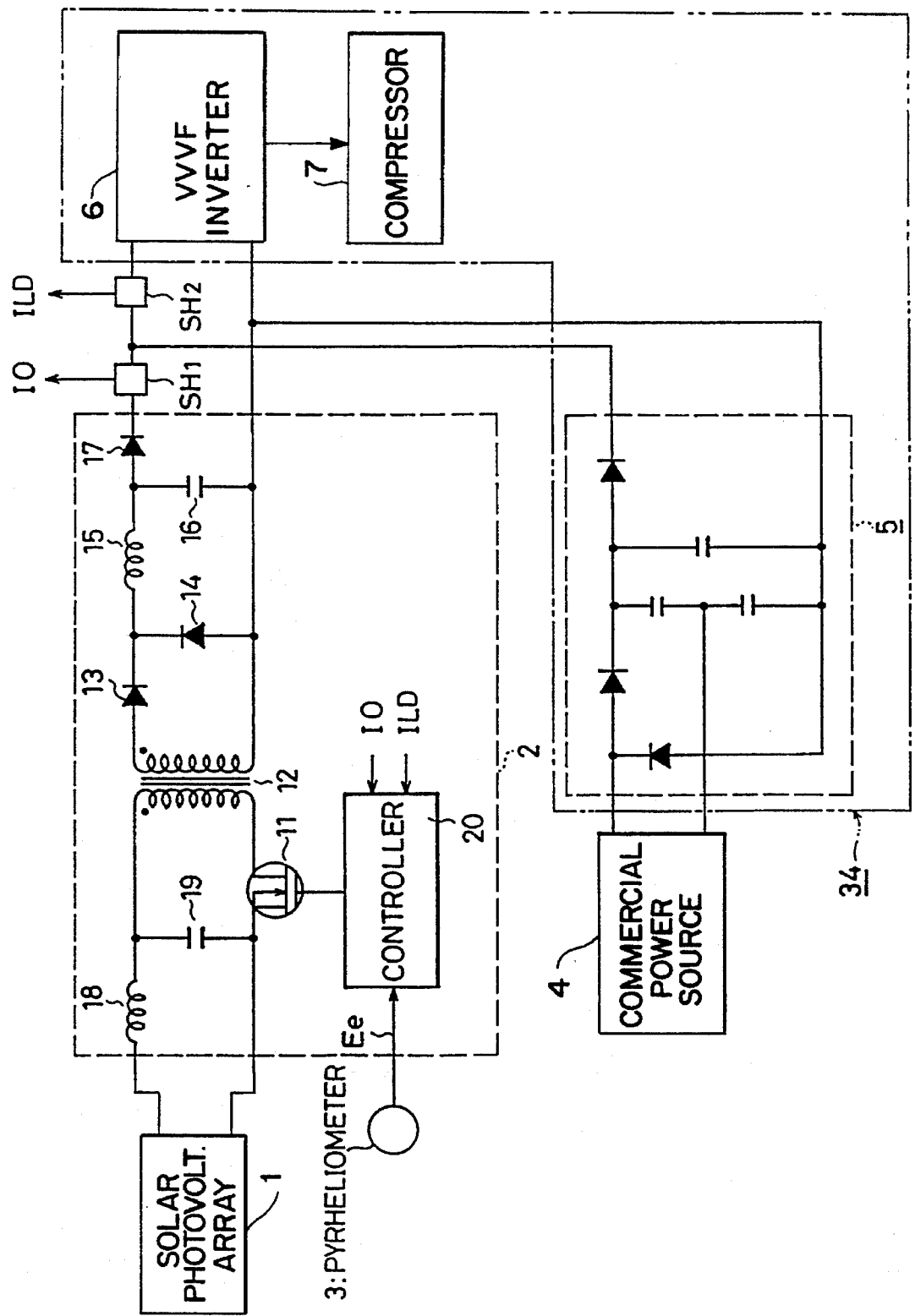

FIGS. 1A and 1B are diagrams showing structure of an electric power supply system according to the first embodiment of the present invention.

With reference to FIG. 1A, the electric power supply system includes a system power control circuit 2 connected with an air conditioner 34 as load of a power supply target. This system further includes a solar photovoltaic array 1 and a commercial the power source 4 as power supply sources. Solar photovoltaic array 1 is connected via system power control circuit 2 to the air conditioner 34. Air conditioner 34 includes a voltage multiplying rectifier circuit 5, a VVVF inverter 6 and a compressor 7. Voltage multiplying rectifier circuit 5 receives as an input an AC voltage applied from commercial power source 4 to rectify the applied AC voltage and output a DC voltage. VVVF inverter 6 converts the applied DC voltage to an AC voltage and outputs the same. Compressor 7 circulates a refrigerant in accordance with a frequency corresponding to the output voltage from VVVF inverter 6.

FIG. 1B shows a circuit configuration of the above-described system power control circuit 2 and also a connection state of system power control circuit 2 and its peripheral circuitry.

With reference to FIG. 1B, system power control circuit 2 includes a high frequency transformer 12 as including a function corresponding to a DC/DC converter having a high conversion efficiency. Circuit 2 further includes on the side of a primary winding of transformer 12 a power MOSFET (Metal Oxide Semiconductor Field Effect Transistor) 11 serving as a switching element for switching and controlling an electric connection between solar photovoltaic array 1 and VVVF inverter 6, and a choke coil 18 and a smoothing capacitor 19 for preventing an output current of solar photovoltaic array 1 from being intermittent and also inhibiting an abrupt output variation of solar photovoltaic array 1. Circuit 2 further includes on the side of a secondary winding of transformer 12 diodes 13, 14 and 17, a choke coil 15 and a smoothing capacitor 16. System power control circuit 2 further includes a controller 20 for controlling ON/OFF of power MOSFET 11. Controller 20 is connected with a pyrheliometer 3 for outputting an intensity signal Ee of insolation in response to the detection of solar radiation energy and connected with current detectors SH1 and SH2. Current detector SH1 detects an output current at an output stage of system power control circuit 2 and outputs a system power control circuit output current value IO. Further, current detector SH2 detects an input current to load at an input stage of VVVF inverter 6 and outputs a VVVF inverter input current value ILD.

Diode 17 operates to prevent a reverse current flowing from commercial power source 4 to system power control circuit 2.

Controller 20 receives as an input insolation intensity Ee and input and output current values IO and ILD and carries out a predetermined program processing. In response to the program processing, controller 20 operates to control ON/OFF of power MOSFET 11. The detail of the ON/OFF control of power MOSFET 11 by controller 20 will be described later.

If power MOSFET 11 is set in an ON state by controller 20, then a power supply path from solar photovoltaic array 1 to VVVF inverter 6 is established, so that power from solar photovoltaic array 1 is supplied to VVVF inverter 6. At that time, with power MOSFET 11 turned on, an output voltage from solar photovoltaic array 1 is applied to the primary winding of transformer 12, and accordingly, a voltage is induced on the secondary winding of transformer 12. Since the induced voltage serves to forwardly bias diode 13, a current flows through diode 13 and choke coil 15 through a path for charging smoothing capacitor 16. After that, if power MOSFET 11 is brought from an ON state into an OFF state by controller 20, then there is no induction of power on the secondary winding of transformer 12 due to the action from the primary winding. Accordingly, reverse-motive power is generated in choke coil 15, so that a current flows through a path established through choke coil 15, smoothing capacitor 16 and diode 14.

A description will now be made on an outline of an operation of the power supply system. It is assumed that activation and operation of air conditioner 34 is made manually or automatically by using a timer function.

System power control circuit 2 starts to be driven in response to being checked to determine that the air conditioner 34 is in an operation state by using commercial power source 4 in controller 20 of system power control circuit 2 and that an output level of solar photovoltaic array 1 reaches a level allowing VVVF inverter 6 to be driven, i.e., insolation intensity Ee larger than or equal to a predetermined insolation intensity for system activation is detected.

When system power control circuit 2 starts to be driven, circuit 2 starts to regulate an operating point of solar photovoltaic array 1 so as to make the output level of solar photovoltaic array 1 gradually larger. This causes an output level of power control circuit 2 to shift to a level in balance with a required power level of VVVF inverter 6. Accordingly, air conditioner 34 performs a steady operation in the balanced state. At that time, power supplied from commercial power source 4 to VVVF inverter 6 is controlled to be set to "0". In a case where even if the operating point of solar photovoltaic array 1 reaches an inherent maximum output point of solar photovoltaic array 1 and the output power level of power control circuit 2 is lower than the power level required by VVVF inverter 6, the operation of air conditioner 34 is continued by supplementing deficient power with supplied power from commercial power source 4 while operating solar photovoltaic array 1 at the maximum output point.

When air conditioner 34 is in an operation state, if insolation intensity Ee becomes smaller than or equal to a predetermined insolation intensity for system activation because of a variation in insolation or a sunset, then solar photovoltaic array 1 becomes unable to supply sufficient power to air conditioner 34. In this case, the driving of system power control circuit 2 is stopped, and the power supply from solar photovoltaic array 1 to VVVF inverter 6 is stopped.

Reactivation of system power control circuit 2 which is carried out after the power supply from solar photovoltaic array 1 is stopped is controlled so that it is carried out when air conditioner 34 is operating and when insolation intensity Ee becomes larger than or equal to the predetermined insolation intensity for system activation, like the aforementioned activation condition.

It is assumed that the operation of air conditioner 34 is stopped manually on the main body of air conditioner 34 or automatically by the timer function, like the activation and operation of air conditioner 34. The driving of system power control circuit 2 is also stopped at the same time air conditioner 34 is stopped, and thus power supply from solar photovoltaic array 1 to VVVF inverter 6 is stopped.

In the power supply system thus structured and operating, a DC voltage output from solar photovoltaic array 1 is applied to VVVF inverter 6 in parallel with a DC voltage output via voltage multiplying rectifier circuit 5 from commercial power source 4. That is, a solar battery utilization air conditioning system for use in combination with the commercial power source 4 is provided.

Figure 2:
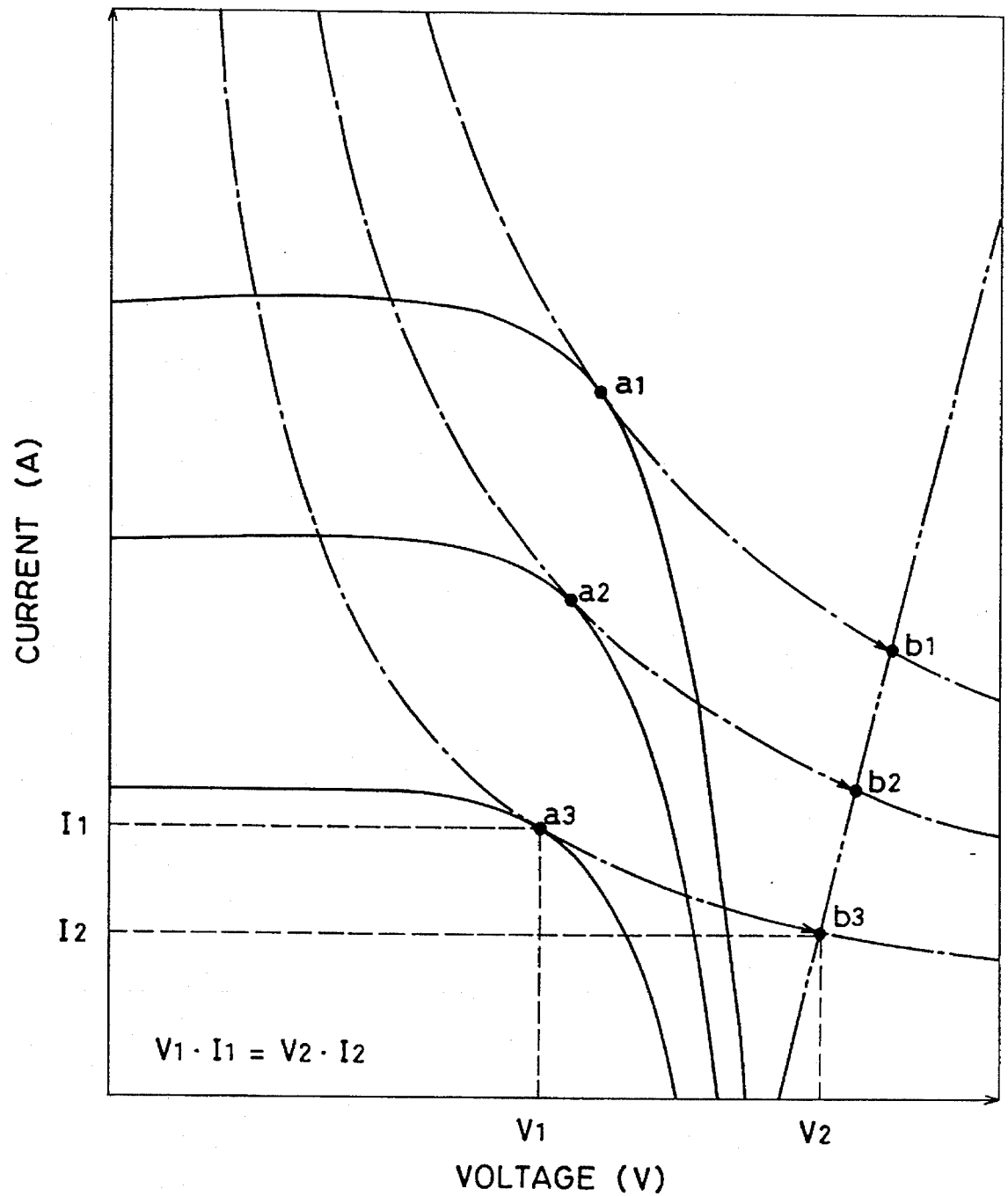
FIG. 2 is a graph showing voltage-current characteristics of a solar photovoltaic array and an air conditioner applied to each embodiment of the present invention.

FIG. 2 is a graph showing voltage-current characteristics of solar photovoltaic array 1 and air conditioner 34 applied to each embodiment of the present invention.

In the graph of FIG. 2, a current (units: A) is represented on a vertical axis, and a voltage (units: V) on a horizontal axis.

In the graph, solid lines denote voltage-current characteristic curves of solar photovoltaic array 1, a chain double-dotted line denotes a voltage-current characteristic curve of air conditioner 34, and chain-dotted lines denote equivalent power curves. Dots a1 to a3 denote operating points of solar photovoltaic array 1, and dots b1 to b3 denote operating points of air conditioner 34. As can be seen from the graph, operating points a1 and b1 are plotted on the same equivalent power curve, operating points a2 and b2 on the same equivalent power curve, and operating points a3 and b3 on the same equivalent power curve. As shown in the graph, operating points a3 and b3, for example, have a relationship of equivalent power shown by $(V_1 \cdot I_1 = V_2 \cdot I_2)$. Accordingly, if the operating point of solar photovoltaic array 1 is variably regulated, then an operating voltage of solar photovoltaic array 1 is also variably regulated in accordance with the variably regulated operating point. Therefore, the variable regulation of the operating point of solar photovoltaic array 1 enables a variable regulation of supplied power from solar photovoltaic array 1 to air conditioner 34. A description will now be made on the variable regulation of the operating point of solar photovoltaic array 1.

An average current $I_{IN}$ flowing on the primary winding of transformer 12 of system power control circuit 2 in FIG. 1B can be expressed by the following equation (1).

$$I_{IN} = V_{IN} \cdot (T_{ON})^2 / (2 \cdot N_2/N_1)^2 \cdot L) / T_S \quad (1)$$

wherein $T_{on}$ is ON time of power MOSFET 11; $V_{IN}$ is an operating voltage (operating point) of solar photovoltaic array 1; $N_1$ is the number of primary windings of transformer 12; $N_2$ is the number of secondary windings of transformer 12; L is an inductance of choke coil 15; and $T_S$ is a switching cycle of power MOSFET 11.

According to the above equation (1), an input resistance $R_{IN}$ of system power control circuit 2 can be expressed by the following equation (2).

$$R_{in} = V_{in}/I_{in} = (2 \cdot (N_2/N_1)^2 \cdot L \cdot T_S/(T_{on})^2) \quad (2)$$

Input resistance $R_{IN}$ represented by the above equation (2) represents the inclination of voltage-current characteristic curves determining the operating point of solar photovoltaic array 1 denoted by the solid line of FIG. 2.

Further, when expressed by using duty ratio $D = C T_{ON}/T_S)$ of circuit 2, input resistance $R_{IN}$ is represented by the following equation (3).

$$R_{IN} = 2 \cdot (N_2/N_1)^2 \cdot L/(T_S \cdot D^2) \quad (3)$$

It is thus understood that the operating point of solar photovoltaic array 1 is uniquely determined by input resistance $R_{IN}$ of system power control circuit 2 (the inclination of the solid lines of FIG. 2) from the above equation (2). In addition, since input resistance $R_{IN}$ can be set variably dependently on duty ratio D of circuit 2 (the duty ratio of power MOSFET 11) from the above equation (3), the operating voltage (operating point) of solar photovoltaic array 1 can be variably controlled by duty ratio D. Accordingly, the control of duty ratio D enables a regulation of supplied power from solar photovoltaic array 1 to air conditioner 34.

Figure 3:
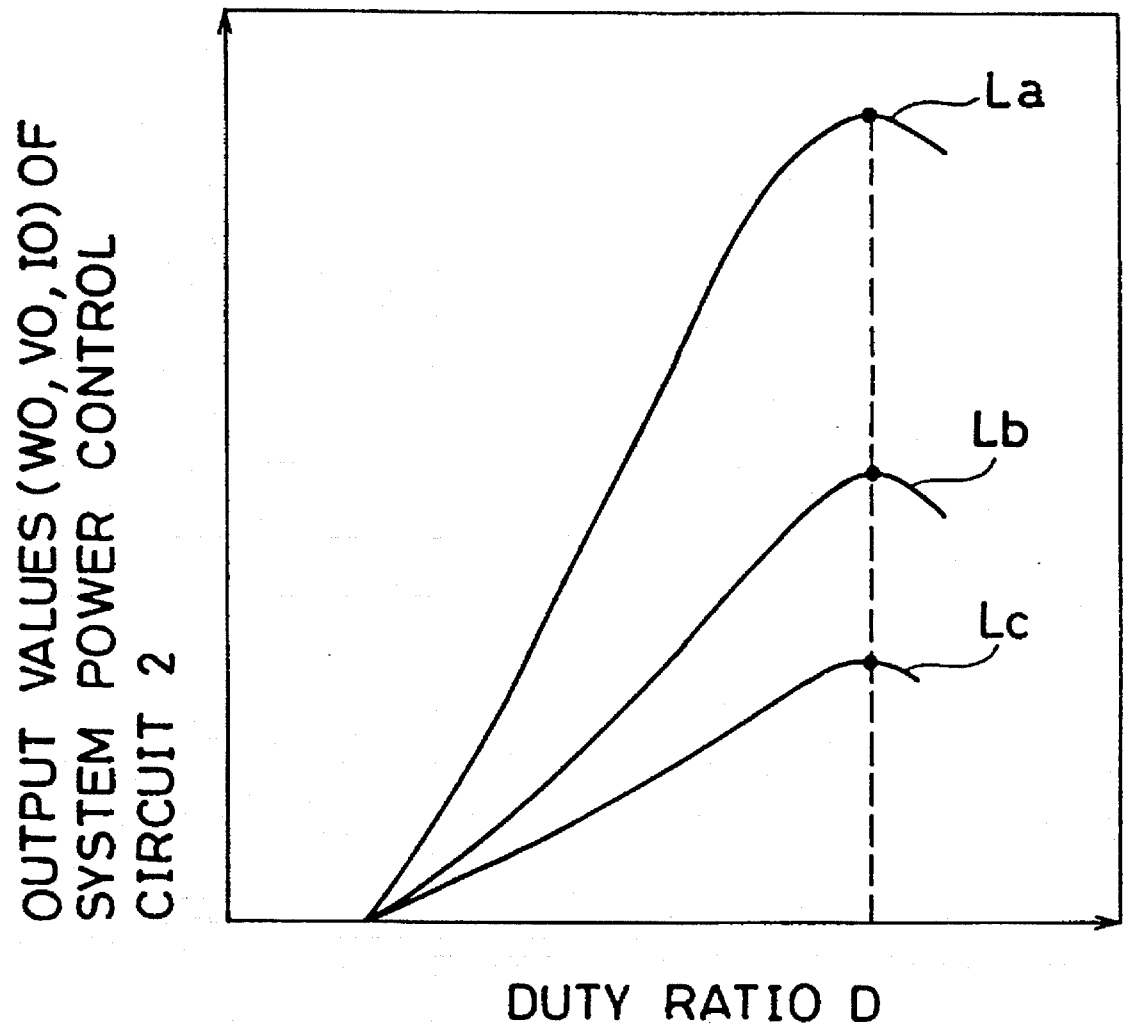
FIG. 3 is a graph showing a relationship between duty ratio of a system power control circuit applied to each embodiment of the present invention and an output of the system power control circuit.

FIG. 3 is a graph showing a relationship between duty ratio D and an output of system power control circuit 2 applied to each embodiment of the present invention.

In the graph of FIG. 3, a vertical axis indicates outputs (an output power value WO, an output voltage value VO and an output current value IO) of system power control circuit 2, and a horizontal axis indicates duty ratio D of system power control circuit 2. Referring to FIG. 3, curves La, Lb and Lc represent characteristic curves of output power value WO, output current value IO and output voltage value VO of circuit 2 with respect to duty ratio D, respectively. As can be seen from FIG. 3, gradually increasing duty ratio D makes it possible to trace a maximum output point of system power control circuit 2 denoted by a dotted line in FIG. 3, i.e., a maximum value of the supplied power from solar photovoltaic array 1 to air conditioner 34.

As has been described above, since electric power supplied from solar photovoltaic array 1 to air conditioner 34 can be arbitrarily regulated by varying duty ratio D, power can be supplied in parallel from solar photovoltaic array 1 and commercial power source 4 to air conditioner 34. This parallel power supply operation will now be described.

When activated, controller 20, for example, first traces a maximum output point of solar photovoltaic array 1 while controlling duty ratio D. As a result, if it is detected that output power of system power control circuit 2 at the maximum output point of solar photovoltaic array 1 is smaller than power required by air conditioner 34 (ILD>IO), controller 20 traces the maximum output point to continue a maximum power supply state. Accordingly, power is supplied in parallel from solar photovoltaic array 1 and commercial power source 4, so that power necessary for driving air conditioner 34 is stably supplied to air conditioner 34. An output voltage of system power control circuit 2 is defined by an output voltage on the side of commercial power source 4, i.e., an output voltage of voltage multiplying rectifier circuit 5, and deficient power is replenished with power from commercial power source 4.

After that, if insolation intensity Ee increases or the power required by air conditioner 34 decreases, then controller 20 detects that output power of circuit 2 exceeds that required power (ILD≦IO), and hence, controller 20 releases the tracing of the maximum output point of solar photovoltaic array 1. Then, controller 20 regulates the operating point of solar photovoltaic array 1 so as to be deviated from the maximum output point and makes output power from solar photovoltaic array 1 equal to the power required by air conditioner 34. At that time, an output voltage ($V_{OUT}$) of power control circuit 2 is set to be constant at a voltage higher than or equal to an upper-limit voltage in the range of voltage variations in voltage multiplying rectifier circuit 5, as shown in the following equation (4). This allows all the power supply to air conditioner 34 to be gradually made from solar photovoltaic array 1, and consequently, the power supplied to air conditioner 34 is no longer taken from commercial power source 4.

$$V_{OUT}=(N_2/N_1)\cdot D\cdot V_{PV} \quad (4)$$

In the above equation (4), $V_{PV}$ is an operating point (operating voltage) of solar photovoltaic array 1 in a state where output power of system power control circuit 2 is equal to required power of air conditioner 34 and is uniquely determined by duty ratio D.

As described above, system power control circuit 2 operates as an interface circuit of solar photovoltaic array 1 and air conditioner 34 to regulate an output of solar photovoltaic array 1 in response to the state of load (the power required state of VVVF inverter 6).

Figure 4:
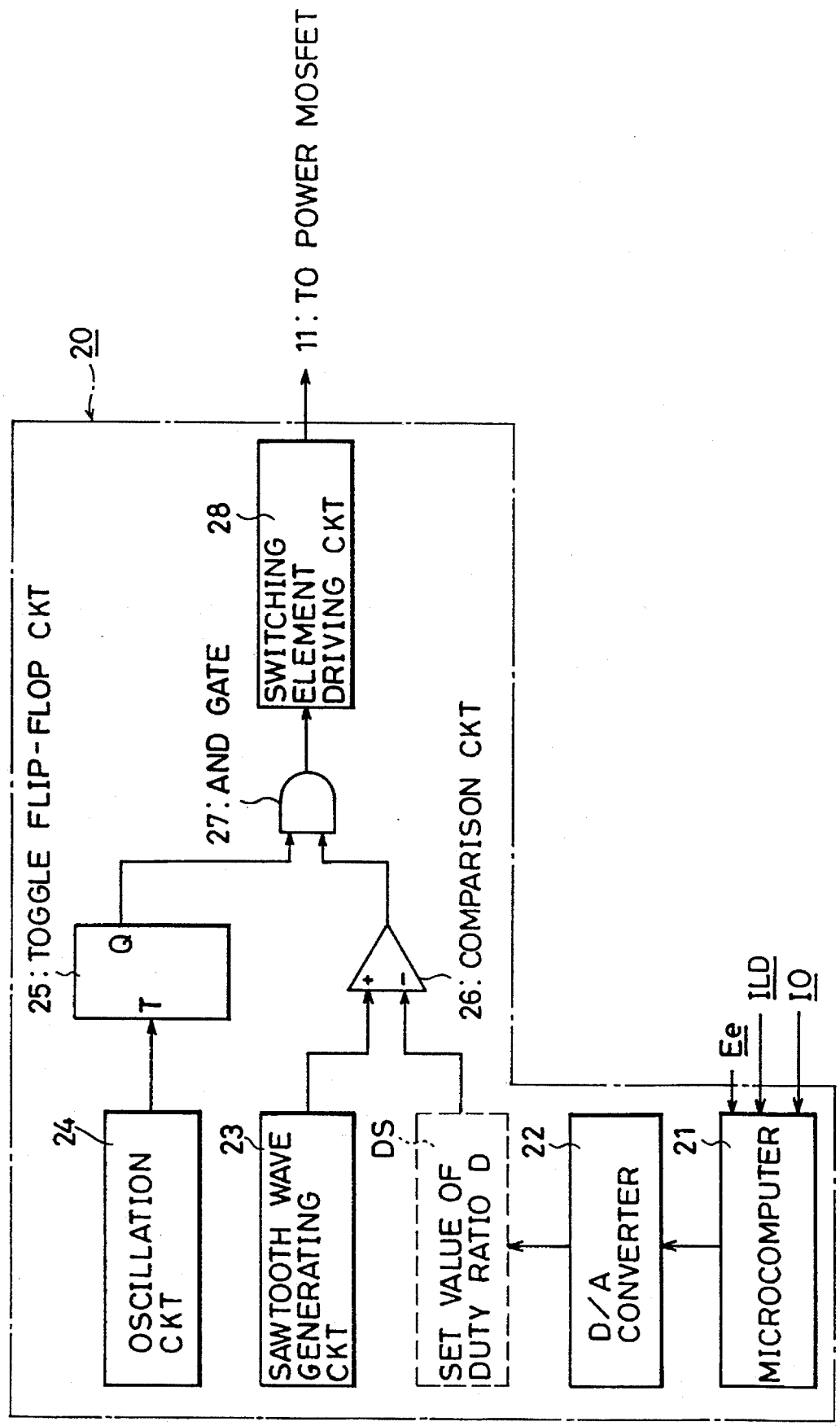
FIG. 4 is a schematic diagram showing a circuit configuration of a controller shown in FIG. 1B.

FIG. 4 is a schematic diagram showing a circuit configuration of controller 20 shown in FIG. 1B.

With reference to FIG. 4, controller 20 receives as inputs, insolation intensity Ee detected on a light receiving surface of solar photovoltaic array 1, output current value IO of system power control circuit 2 and input current value ILD of VVVF inverter 6 to determine the aforementioned duty ratio D and control an ON/OFF switching operation of power MOSFET 11 in accordance with the determined duty ratio D. More specifically, controller 20 includes a microcomputer 21 incorporating a CPU (Central Processing Unit), a memory and the like not shown, a D/A converter 22 for receiving a digital signal corresponding to the duty ratio D applied from microcomputer 21 to convert the received digital signal into an analog signal and output the same, a sawtooth wave generating circuit 23 stably operating in a definite cycle, and an oscillation circuit 24 for outputting a rectangular wave of, for example, 80 KHz. Controller 20 further includes a toggle flip-flop circuit 25 for receiving as an input an output of oscillation circuit 24 to derive only a high level period of an input signal to its output, a comparison circuit 26, an AND gate 27 and a switching element driving circuit 28.

Comparison circuit 26 has its noninversion input terminal provided with an output signal of sawtooth wave generating circuit 23 and its inversion input terminal provided with a set value DS of duty ratio D output through microcomputer 21 and D/A converter 22. Comparison circuit 26 responds to the output signal and set value DS to perform a comparison operation and applies the result of the comparison to one input of AND gate 27 at a succeeding stage. A rectangular wave output generated by oscillation circuit 24 and toggle flip-flop circuit 25 is applied to the other input of AND gate 27. AND gate 27 performs an AND operation for the two applied input signals and controls switching element driving circuit 28 connected to the succeeding stage to turn on power MOSFET 11 in accordance with the result of the AND operation. Switching element driving circuit 28 receives an applied signal to generate a signal of a predetermined level and apply the same to a gate electrode of power MOSFET 11 connected to the succeeding stage. In response to the application of the signal, power MOSFET 11 is turned on.

Controller 20 is structured such that when set value DS of duty ratio D is equal to 0, AND gate 27 outputs a signal having a period in which duty ratio D is 0.5. Set value DS is set to be a relation (duty ratio D<0.5).

Since controller 20 obtains set value DS of duty ratio D by a predetermined program processing in accordance with insolation intensity Ee, output current value IO and input current value ILD in microcomputer 21 and controls ON/OFF of power MOSFET 11 in accordance with duty ratio D based on the obtained set value DS, controller 20 is able to variably control the power supplying capability of solar photovoltaic array 1.

Figure 5:
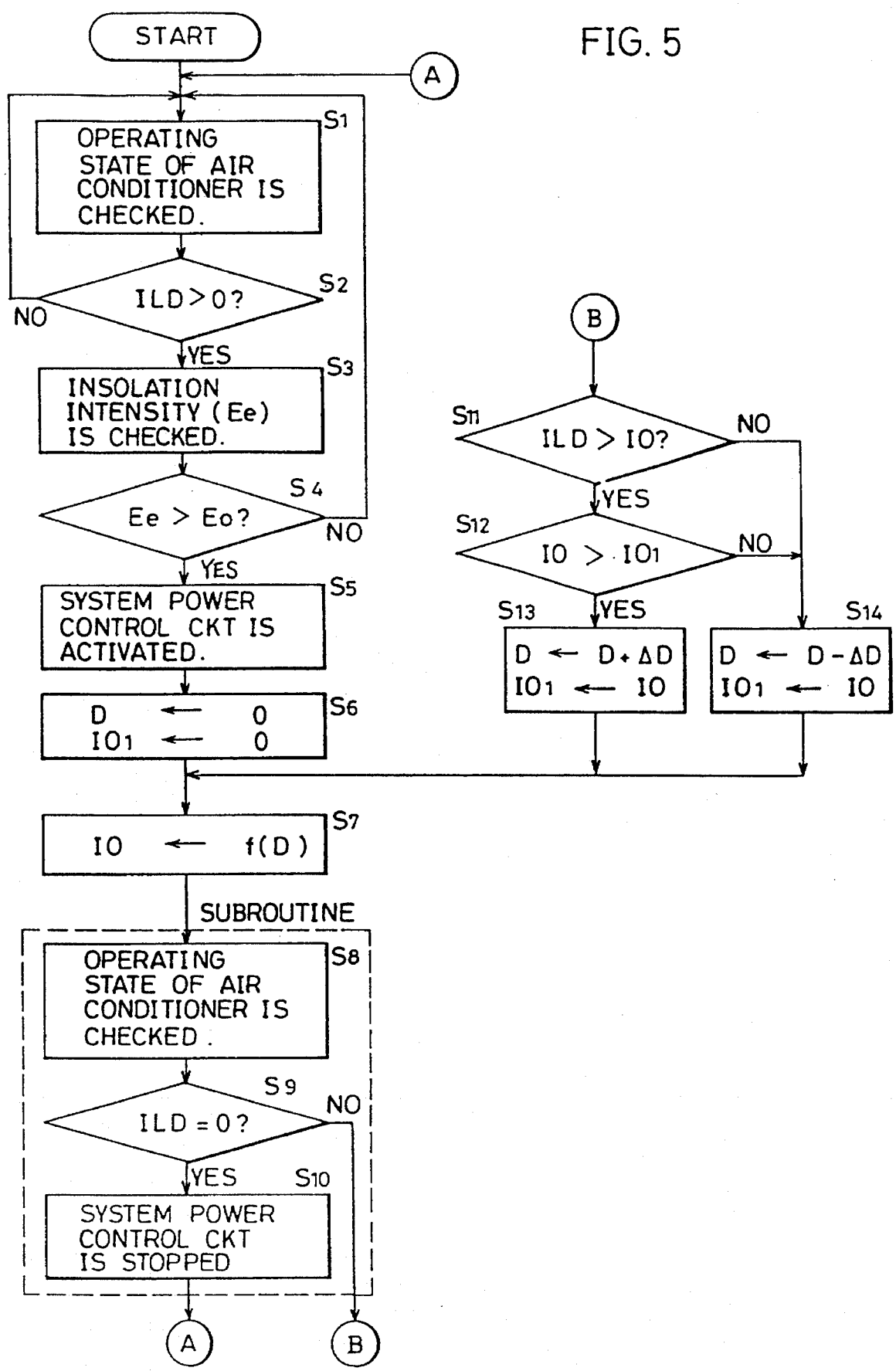
FIG. 5 is a schematic flow chart for use in explaining a drive control of the system power control circuit carried out in a controller of FIG. 4.

FIG. 5 is a schematic flow chart for use in explaining a drive control of system power control circuit 2 carried out by controller 20 of FIG. 4.

This processing flow is stored in advance as a program into an internal memory of microcomputer 21 and executed under control by the CPU of microcomputer 21.

A description will now be made of a control operation of the system power control circuit 2 by controller 20.

A region for storing data of applied output current value IO, input current value ILD and insolation intensity Ee therein is provided in advance in the internal memory of microcomputer 21. An insolation intensity $E_0$ necessary for activation of system power control circuit 2 and a control amount $\Delta D$ of duty ratio D are set in advance and stored into the internal memory. Further, a region for storing therein a variable IO1 for use in holding a previous value of output current value IO is provided in advance in the internal memory.

When the system starts to operate, the CPU of microcomputer 21 determines whether to activate system power control circuit 2, in processings in steps S1 to S4 of FIG. 5. In detail, the CPU receives an input current value ILD and determines whether or not a relation (ILD>0) is satisfied, thereby checking to determine if air conditioner 34 is operating or not, in the processings in steps S1 and S2. At that time, if the relation (ILD>0) is determined and the operating state of air conditioner 34 is checked, then the CPU subsequently determines if insolation intensity Ee necessary for driving of system power control circuit 2 is present. That is, in the processings in steps S3 and S4, the CPU receives insolation intensity Ee as an input and compares in magnitude the insolation intensity with insolation intensity $E_0$ stored in advance in the memory. If a relation (Ee>$E_0$) is also satisfied, then the CPU starts a subsequent processing from step S5 in response to satisfaction of all requirements necessary for starting to drive system power control circuit 2.

If either the relation (ILD>0) or the relation (Ee>$E_0$) is not determined, then the CPU returns to the processing in step S1 and repeats the same processing as above.

As described above, the CPU receives the input power value ILD and insolation intensity Ee to determine whether or not air conditioner 34 is operating and whether or not system power control circuit 2 can be started so as to be driven.

If the necessary requirements for starting to drive system power control circuit 2 are satisfied as mentioned above, then the CPU starts to drive system power control circuit 2 in the processing in the next step S5. More specifically, with reference to FIG. 4, comparison circuit 26 starts to output a signal of a level in which power MOSFET 11 is turned on. Thus, the CPU starts to gradually decrease the set value DS of duty ratio D. That is, the set value (DC voltage level) DS is gradually decreased so as not to exceed a maximum voltage level output by sawtooth wave generating circuit 23. This causes a signal of a high level to appear on an output signal of switching element driving circuit 28, thereby allowing power MOSFET 11 to be turned on. Accordingly, power starts to be supplied from solar photovoltaic array 1 through system power control circuit 2 to air conditioner 34.

After that, in the processing in step S6, the CPU sets a value "0" to duty ratio D and variable IO1 stored in the memory, thereby initializing duty ratio D and variable IO1. In the next step S7, the CPU receives applied output current value IO and stores the same as digital data into the memory. (Output current value IO may be obtained from duty ratio D on the basis of FIG. 3.) Then, a subroutine processing is carried out for driving/stopping system power control circuit 2 including the processings in steps S8 to S10.

In the processings in steps S8 and S9 in the subroutine processing, if the CPU receives input current value ILD and determines a relation (ILD=0), then it is determined that air conditioner 34 is not operating. In accordance with the determination, the CPU sets power MOSFET 11 to be turned off, thereby stopping the driving of system power control circuit 2 in the processing in step S10. After that, the CPU returns to the processing in step S1 and prepares for a re-start of the operation of air conditioner 34. Conversely, if the relation (ILD=0) is not determined in the processing in step S9, then since air conditioner 34 is operating, the CPU goes through the subroutine processing and moves to the next processing in step S11.

In processings including steps S11 to S14, duty ratio D is controlled so that supplied power from the solar photovoltaic array 1 is regulated in accordance with the result of comparison between input current value ILD and output current value IO or a tendency of increasing/decreasing output current value IO. More specifically, if the CPU determines relations (ILD>IO) and (IO>IO1), then the CPU updates set value DS so as to make duty ratio D have a relation (D←D+$\Delta D$) in step S13, to further increase output current value IO (see FIG. 3). Accordingly, a tracing to a maximum output point of the supplied power of solar photovoltaic array 1 continues so that the required power of air conditioner 34 can be supplied. A deficiency of the supplied power with respect to the required power is supplied from commercial power source 4. If the CPU determines that the relation (ILD>IO) is not satisfied, then the CPU updates set value DS so as to set duty ratio D to be (D←D−$\Delta D$) in step S14 and decreases output current value IO (see FIG. 3). Accordingly, when insolation intensity Ee increases and the required power decreases by operation of air conditioner 34, for example, the supplied power from solar photovoltaic array 1 to air conditioner 34 can be decreased with the decrease in required power and can be balanced with the required power. When the supplied power from solar photovoltaic array 1 is balanced with the required power of air conditioner 34, power is supplied only from solar photovoltaic array 1 to air conditioner 34. If the CPU determine the relation (ILD>IO) not (IO>IO1) is satisfied, then the CPU updates set value DS so as to set duty ratio D to be (D←D−$\Delta D$) in step S14 and further increases output current value IO (see FIG. 3). Accordingly, when there is such a weather change as to decrease the intensity of insolation, or alternatively, when the required power is increased with operation of air conditioner 34, for example, the tracing to a maximum power point is continued so as to make the supplied power by the solar photovoltaic array 1 maximal. A deficient supplied power at the time of the maximum output of solar photovoltaic array 1 is supplied in parallel from. commercial power source 4.

In the processing in steps S13 and S14, duty ratio D is updated and also the present output current value IO is set to variable IO1, whereby variable IO1 becomes a previous value of output current IO. The CPU then prepares for a comparison processing in the next step S12. After the end of the processing step S13 or S14, the CPU again returns to the processing step S7 and the same processing is repeated.

Thus, controller 20 controls the output level of solar photovoltaic array 1 by control of duty ratio D (the operating point of solar photovoltaic array 1) so that the output level maintains the maximum output level, while an excessive supply is prevented.

While the above-described power supply system shown in FIG. 1B carries out the regulation of the operating point of solar photovoltaic array 1 in accordance with input current value ILD and output current value IO, the operating point regulation can be made by employing an input voltage value VLD to be applied to VVVF inverter 6 in place of input current value ILD. A description will now be made on the regulation of the operating point of solar photovoltaic array 1 in accordance with input voltage value VLD and output current value IO.

Figure 6:
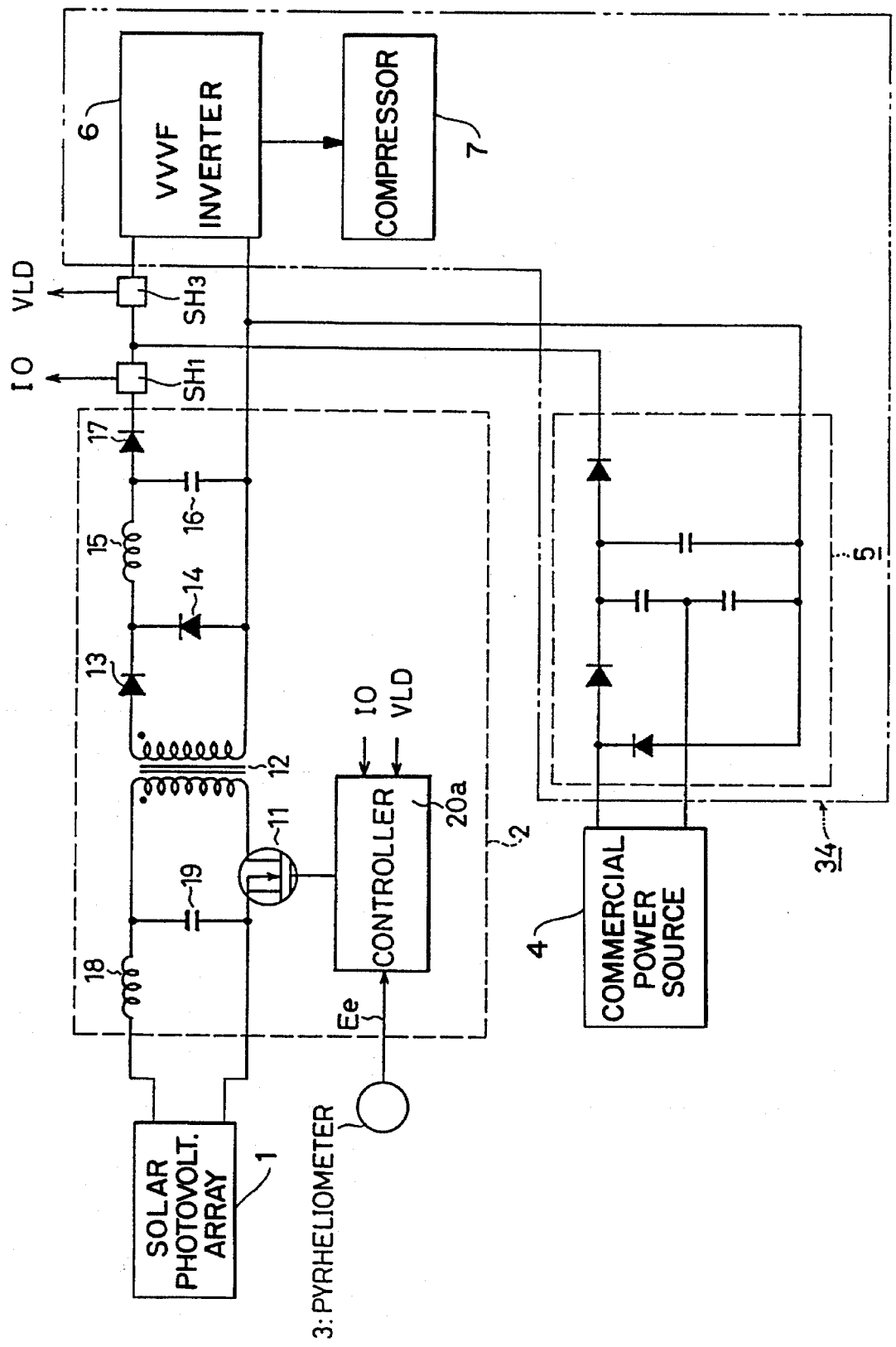
FIG. 6 is a diagram showing structure of an electric power supply system according to a second embodiment of the present invention.

FIG. 6 is a diagram showing structure of an electric power supply system according to a second embodiment of the present invention.

The power supply system of FIG. 6 is different from that of FIG. 1B in that the system of FIG. 6 includes a voltage detector SH3 and a controller 20a in place of current detector SH2 and controller 20, respectively. Since the other structure in the system of FIG. 6 is identical to that of FIG. 1B, a detailed description thereof will not be repeated here.

With reference to FIG. 6, voltage detector SH3 is provided at an input stage of VVVF inverter 6 to detect an input voltage to be applied to VVVF inverter 6 and apply an input voltage value VLD to controller 20a.

Figure 7:
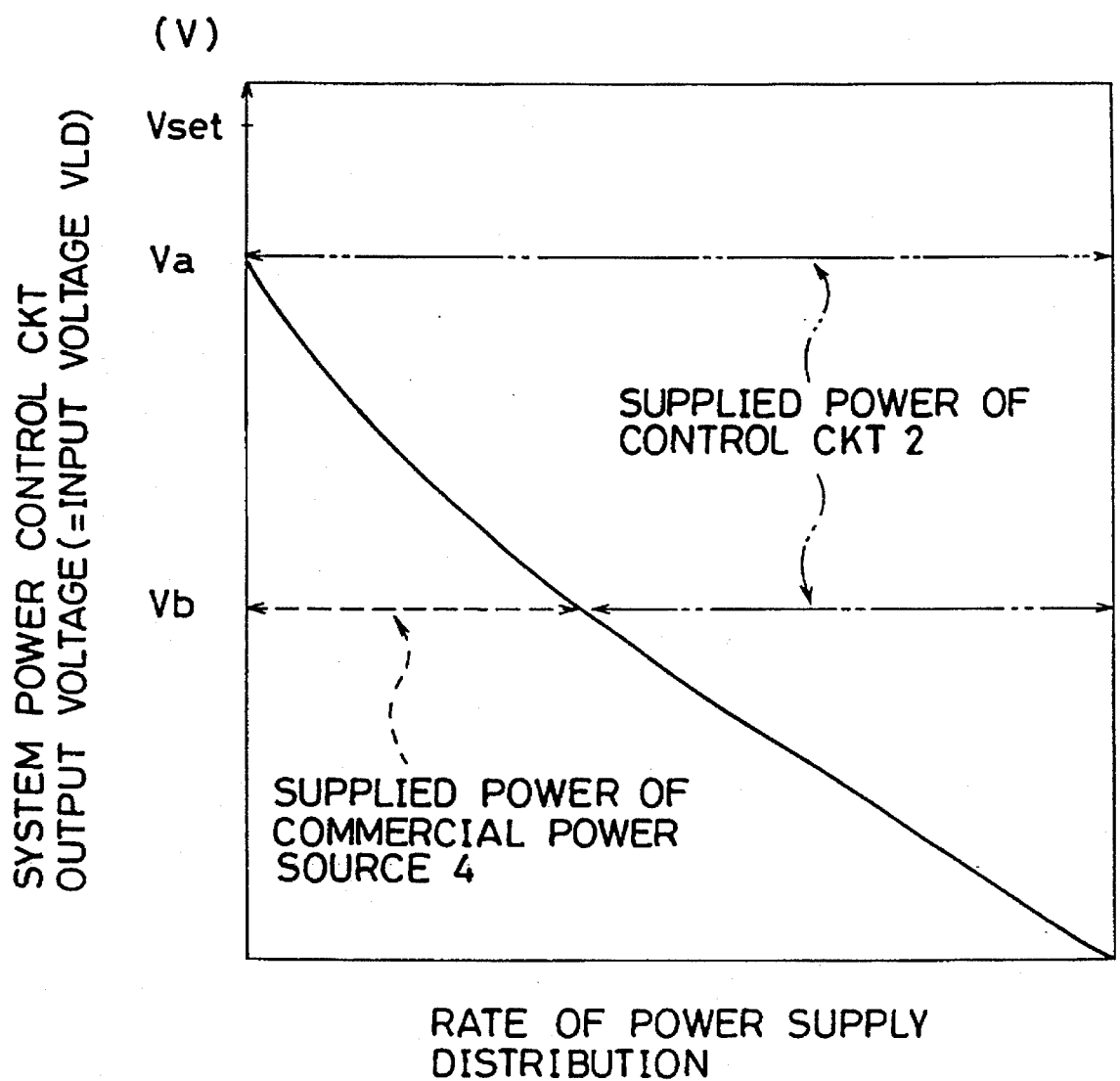
FIG. 7 is a graph showing characteristics of power supply distribution to an air conditioner by an output of a system power control circuit and that of a commercial power source.

FIG. 7 is a graph showing characteristics of power supply distribution to air conditioner 34 by an output of system power control circuit 2 and an output of commercial power source 4.

With reference to FIG. 7, a vertical axis of the graph indicates an output voltage of control circuit 2, and a horizontal axis indicates the rate of power supply distribution to air conditioner 34. A maximum input voltage value Vset of VVVF inverter 6 is shown in FIG. 7. When input voltage value VLD=Vb, for example, it is understood that output power of commercial power source 4 denoted by a chain dotted line and output power of control circuit 2 denoted by chain double-dotted lines are used in combination in a proportion shown in the graph and supplied to VVVF inverter 6 (air conditioner 34). When input voltage value VLD increases to Va, for example, it is understood that required power of VVVF inverter 6 is supplied by using only the output power of control circuit 2 denoted by the chain double-dotted lines.

As has been described already, the output of control circuit 2 is regulated by control of duty ratio D. In other words, input voltage value VLD of VVVF inverter 6 is regulated by control of duty ratio D.

Referring again to FIG. 6, since controller 20a controls duty ratio D so that output current value IO becomes maximal, solar photovoltaic array 1 is also operating at a maximum power point. When output power from solar photovoltaic array 1 is balanced with required power of VVVF inverter 6 by control of duty ratio D by controller 20a, the output voltage value (=input voltage value VLD) of control circuit 2 becomes equal to Va (see FIG. 7). When the output voltage of control circuit 2 is Va, if the operating point of solar photovoltaic array 1 does not reach a maximum power point, controller 20a further controls duty ratio D to make the operating point be the maximum power point. Hence, the output voltage value of control circuit 2 further increases over Va. In that case, input voltage value VLD to VVVF inverter 6 becomes excessive, whereby VVVF inverter 6 might break down. Thus, when input voltage value VLD becomes excessive, controller 20a controls duty ratio D so that the output voltage of control circuit 2 becomes constant at a preset maximum input voltage value Vset of VVVF inverter 6 (see FIG. 7). This makes it possible to keep VVVF inverter 6 from breakdown due to the excess voltage supply.

Figure 8:
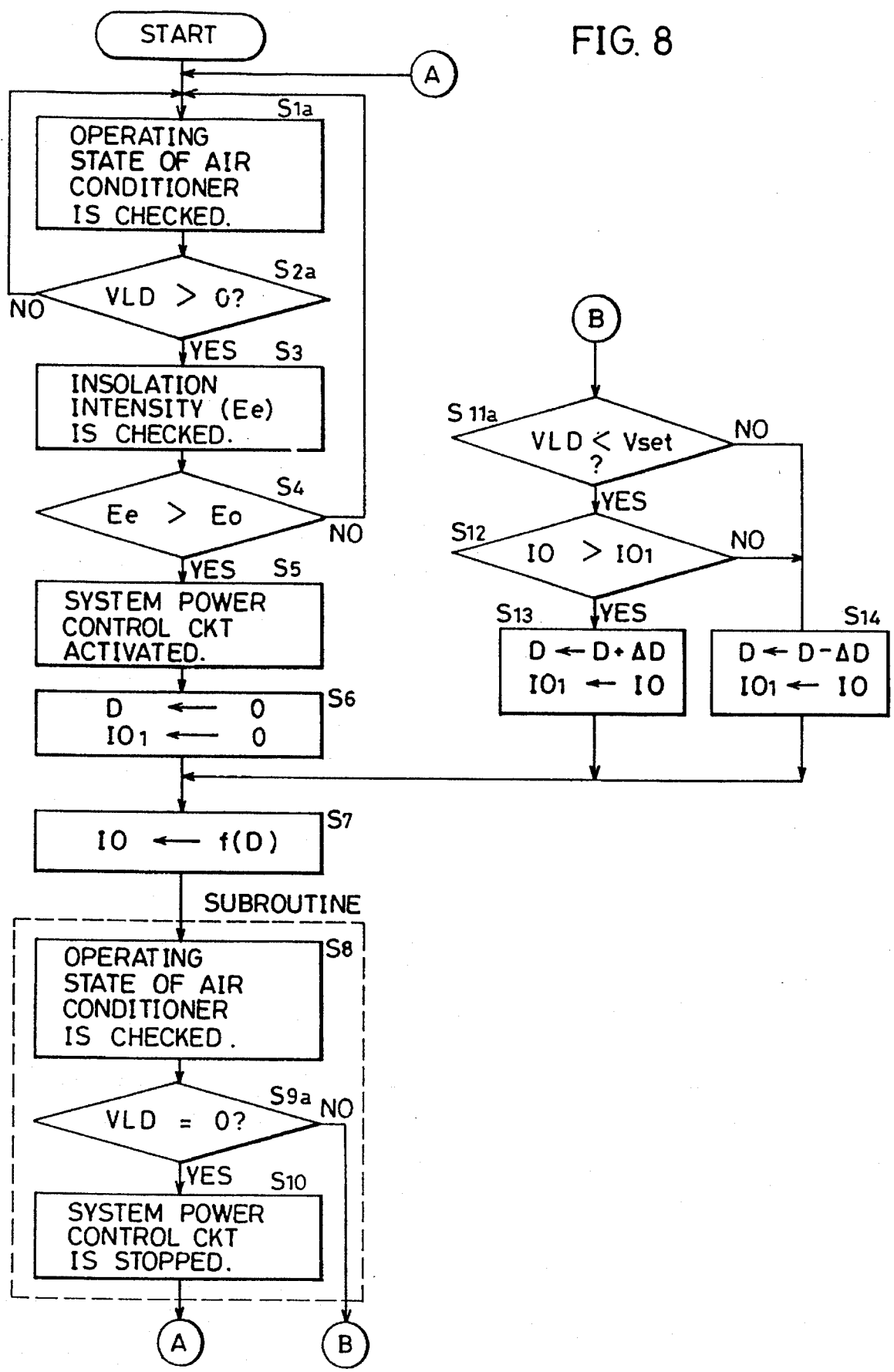
FIG. 8 is a schematic flow chart for use in explaining a drive control of a system power control circuit carried out in a controller of FIG. 6.

FIG. 8 is a schematic flow chart for use in explaining a drive control of system power control circuit 2 carried out in controller 20a of FIG. 6.

The operation of controller 20a will now be described with reference to the flow chart of FIG. 8. Controller 20a incorporates a microcomputer like the foregoing controller 20. The processing flow of FIG. 8 is stored in advance as a program into an internal memory of the microcomputer of controller 20a and carried out under control by the microcomputer.

In the processing flow of FIG. 8, since the processing contents of steps other than steps S1a, S2a, S9a and S11a are identical to those of the processing flow of FIG. 5, only a brief description will be made thereon.

When the system beings operation, a CPU of the microcomputer determines whether to activate system power control circuit 2 in accordance with applied input voltage value VLD and insolation intensity Ee, in the processing steps S1a to S4a of FIG. 8. In detail, when relations (VLD>0) and (Ee>$E_0$) are satisfied, since air conditioner 34 is in an operating state and insolation intensity Ee is over insolation intensity $E_0$ necessary for activation of control circuit 2, requirements for activation of control circuit 2 are satisfied. When determining the relations (VLD>0) and (Ee>$E_0$), the CPU starts processing at step S5. Conversely, if the CPU does not determine either the relation (VLD>0) or (Ee>$E_0$), then circuit 2 is not activated and the CPU returns again to the processing in step S1. Then, the subsequent processings are likewise repeated.

In the processing in steps S5 to S7, the same processing as those of FIG. 5 are carried out. That is, the CPU starts to turn MOSFET 11 on, initializes duty ratio D and variable IO1 and receives output current value IO.

After that, a subroutine processing for driving/stopping control circuit 2, including the processings in steps S8 to S10 is carried out. In the subroutine processing, the CPU determines whether or not a relation (VLD=0) is satisfied, and controls control circuit 2 to stop its driving in accordance with the result of the determination. If the relation (VLD=0) is satisfied, since air conditioner 34 stops its operation, the driving of control circuit 2 is stopped and the CPU again returns to the processing step S1. Conversely, if a relation (VLD≠0) is satisfied, since air conditioner 34 is operating, the CPU moves to a processing step S11a so as to control the driving of control circuit 2.

In processing including steps S11a–$S_{14}$, duty ratio D is controlled in accordance with the result of comparison between input voltage value VLD and maximum input voltage value Vset of the VVVF inverter 6 and in accordance with a tendency of increasing/decreasing output current value IO. More specifically, the CPU stores in advance maximum voltage value Vset into the internal memory. If the CPU determines (VLD<Vset) and (IO>IO1), then duty ratio D is updated to (D←D+ΔD) and input voltage value VLD is increased. Accordingly, a tracking process of the operating point of solar photovoltaic array 1 to a maximum power point is carried out so that required power of air conditioner 34 can be supplied.

If the CPU determines the relation (VLD<Vset) is not satisfied, then duty ratio D is updated to (D←D−ΔD) and input voltage value VLD is decreased. Accordingly, duty ratio D is set to a value corresponding to maximum voltage value Vset so that an excess power supply to VVVF inverter 6 can be avoided and the required power of air conditioner 34 can be supplemented with only the supplied power of solar photovoltaic array 1.

If the CPU determines that the relation (VLD<Vset) is satisfied and the relation (IO>IO1) is not satisfied, then duty ratio D is updated to (D←D−ΔD) and output current value IO, i.e., input voltage value VLD is further increased. Accordingly, the tracking processing of the operating point of solar photovoltaic array 1 to the maximum power point is carried out.

As described above, the CPU controls duty ratio D so that input voltage value VLD may not exceed maximum voltage value Vset while maintaining the operating point of solar photovoltaic array 1 at the maximum power point. After the control of duty ratio D, the CPU returns again to the processing step S7 and receives output current value IO.

Then, the subroutine processing is again carried out and the processing in steps S11a–S14 are repeated, in which duty ratio D is likewise controlled.

While in the above-described electric power supply system according to the second embodiment shown in FIG. 6, the regulation of the operating point of solar photovoltaic array 1 is made in accordance with input voltage value VLD to VVVF inverter 6 and output current value IO, output current value IO can be replaced with output voltage value VO of control circuit 2. A description will now be made on a regulation of the operating point of solar photovoltaic array 1 in accordance with output voltage value VO and input voltage value VLD.

Figure 9:
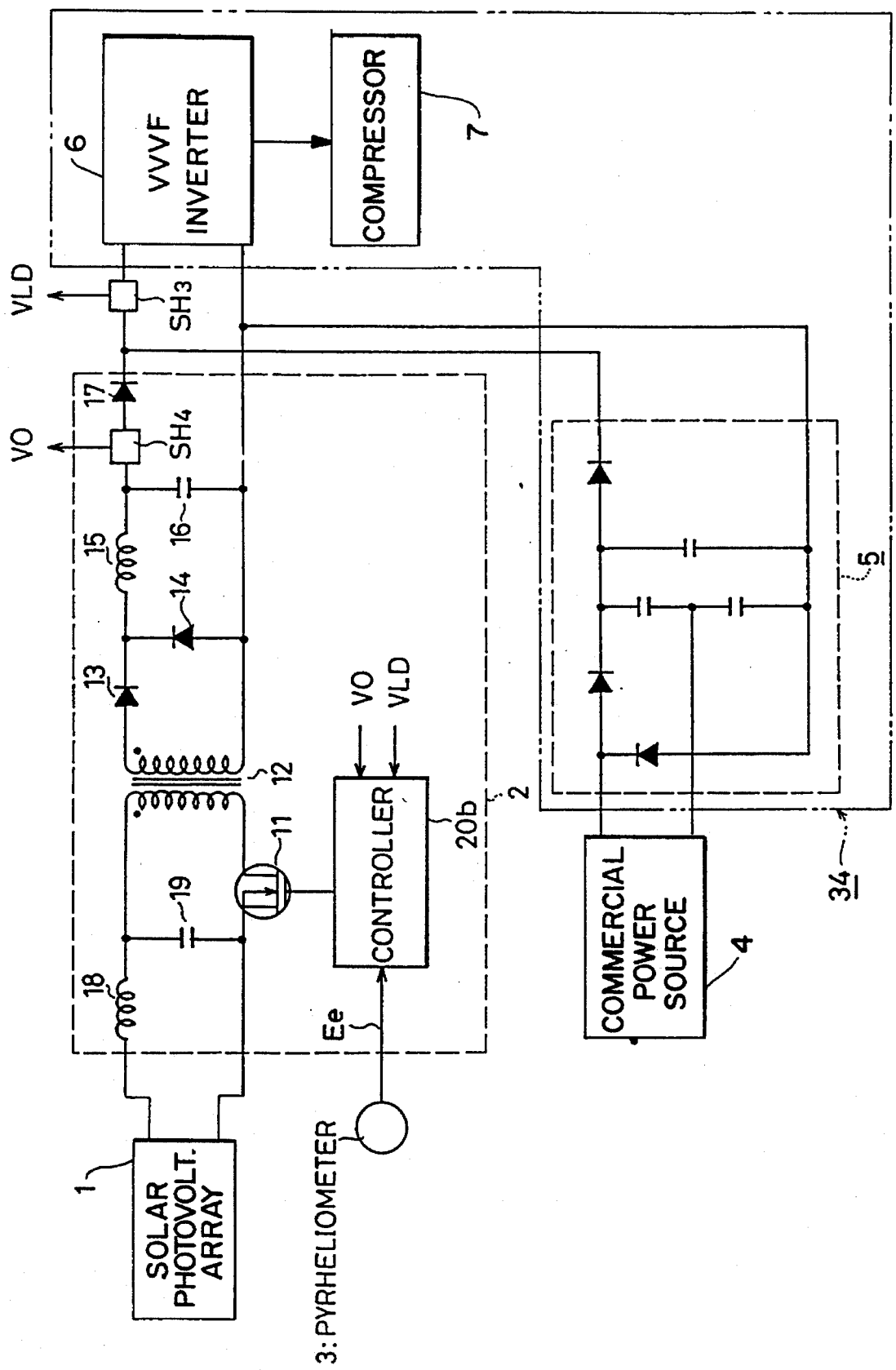
FIG. 9 is a diagram showing structure of an electric power supply system according to a third embodiment of the present invention.

FIG. 9 is a diagram showing structure of an electric power supply system according to a third embodiment of the present invention.

The electric power supply system structure of FIG. 9 is different from that of FIG. 6 in that the system of FIG. 9 includes a voltage detector SH4 and a controller 20b in place of current detector SH1 and controller 20a, respectively in the system of FIG. 6. Since the other structure in the system of FIG. 9 is identical to that of FIG. 6, a detailed description thereof will not be repeated here.

With reference to FIG. 9, voltage detector SH4 is provided at a preceding stage of diode 17. Voltage detector SH4 detects an output voltage of system power control circuit 2 at an input stage of diode 17 to apply an output voltage value VO to controller 20b, as shown in FIG. 9. Controller 20b receives as inputs an insolation intensity Ee, output voltage value VO and an input voltage value VLD to control duty ratio D so that output voltage value VO becomes maximum. As shown in FIG. 3, output power of system power control circuit 2 increases with an increase in output voltage value VO by control of duty ratio D. Accordingly, if controller 20b controls duty ratio D so that output voltage value VO becomes maximum, then solar photovoltaic array 1 operates at a maximum power point and also the output of system power control circuit 2 becomes maximum.

Figure 10:
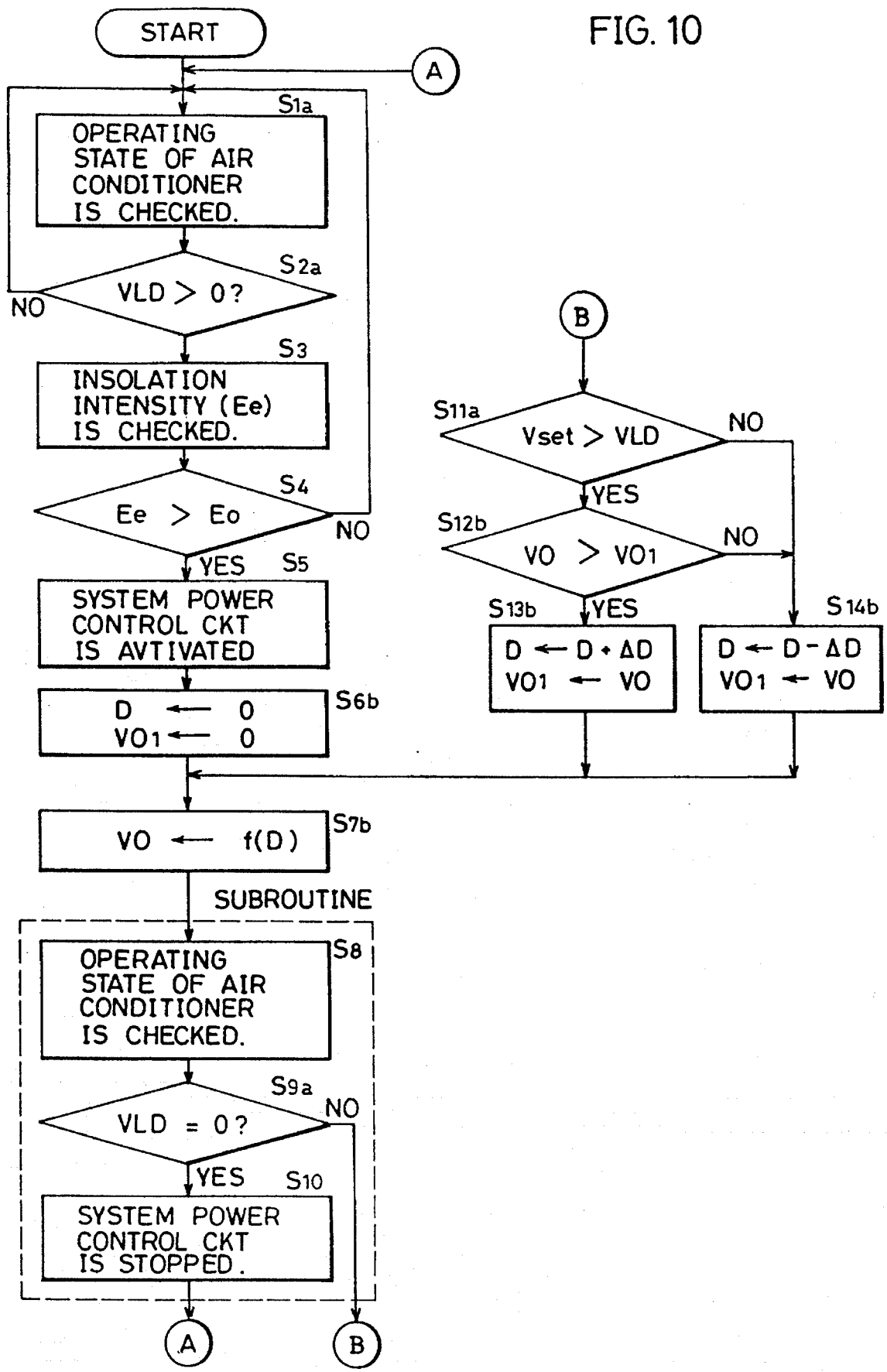
FIG. 10 is a schematic flow chart for use in explaining a drive control of a system power control circuit carried out in a controller of FIG. 9.

FIG. 10 is a schematic flow chart for use in explaining a drive control of system power control circuit 2 carried out in controller 20b of FIG. 9.

Respective processing in steps S6b, S7b, S12b, S13b and S14b in the flow chart of FIG. 10 substitute for the respective processing steps S6, S7, S12, S13 and S14 in the flow chart of FIG. 8, and a regulation of the operating point of solar photovoltaic array 1 is carried out by employing output voltage value VO and input voltage value VLD. Processing in the other steps in the flow chart of FIG. 10 are identical to those in FIG. 8.

Controller 20b repetitively controls duty ratio D in accordance with input voltage value VLD and output voltage value VO so that the operating point of solar photovoltaic array 1 tracks the maximum power point, as shown in FIG. 10. Further, in order to avoid an excess voltage supply to VVVF inverter 6, this tracking control is carried out so that input voltage value VLD will not exceed a preset maximum input voltage value Vset to VVVF inverter 6.

Since the operation of controller 20b according to the third embodiment substitutes processing in accordance with output voltage value VO only for the processing in accordance with output current value IO in the operation of controller 20a according to the second embodiment, a description thereof is limited to the illustration of the flow chart (see FIG. 10).

While the regulation of the operating point of solar photovoltaic array 1 is made in accordance with any two parameters of output current value IO, input current value ILD, input voltage value VLD and output voltage value VO in the electric power supply systems according to the first to third embodiments, the regulation of the operating point may also be made in accordance only with input voltage value VLD to VVVF inverter 6. A description will now be made on the regulation of the operating point of solar photovoltaic array 1 in accordance only with input voltage value VLD.

Figure 11:
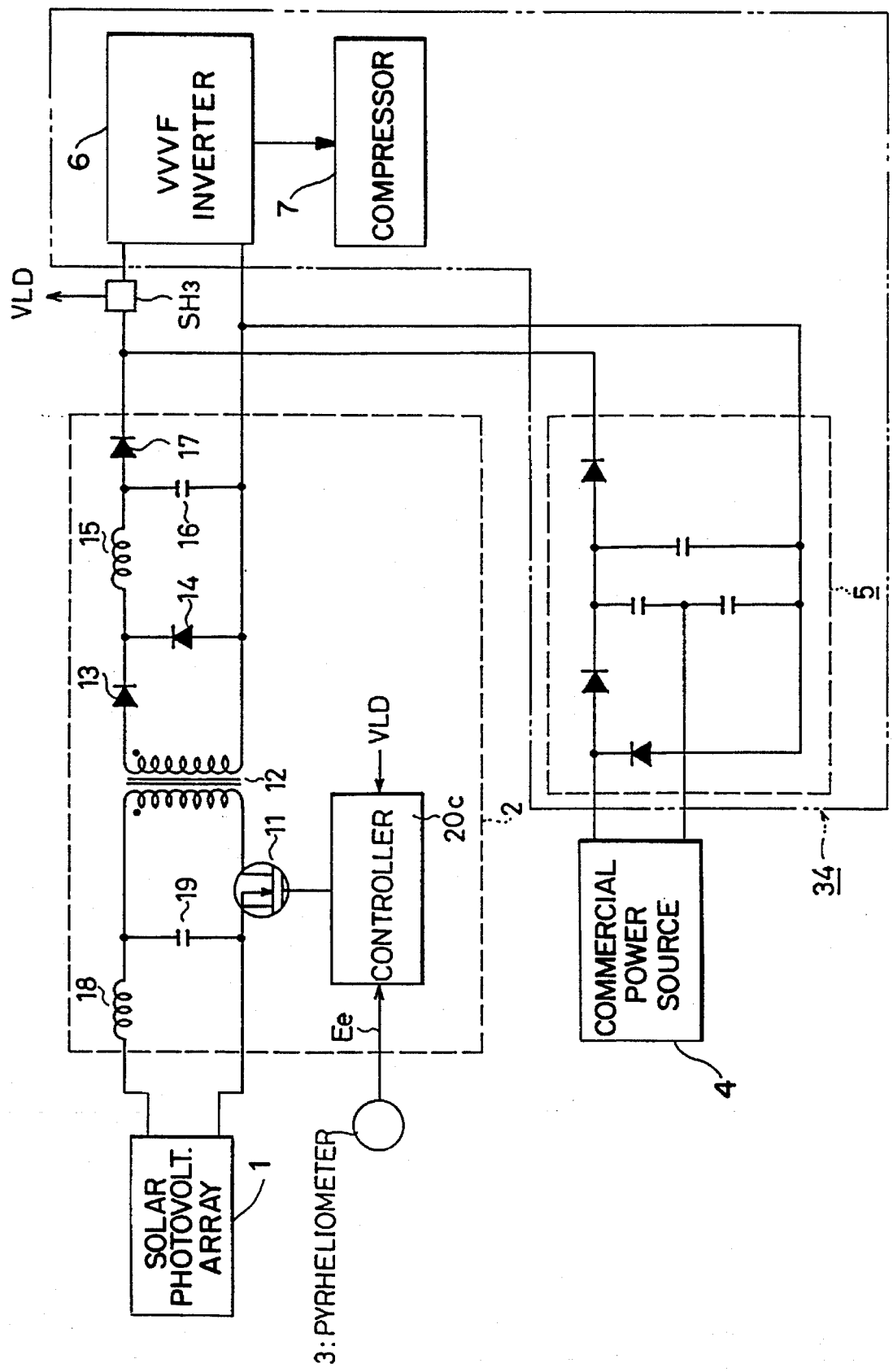
FIG. 11 is a diagram showing structure of an electric power supply system according to a fourth embodiment of the present invention.

FIG. 11 is a diagram showing structure of an electric power supply system according to a fourth embodiment of the present invention.

The electric power supply system structure of FIG. 11 is different from that of FIG. 6 in that current detector SH1 of FIG. 6 is eliminated and that controller 20a of FIG. 6 is replaced with a controller 20c. Since the other structure in the system of FIG. 11 is identical to that in FIG. 6, a detailed description thereof will not be repeated here.

With reference to FIG. 11, controller 20c receives as inputs an input voltage value VLD applied by voltage detector SH3 and an insolation intensity Ee to control duty ratio D so that input voltage value VLD becomes maximum. As shown in FIG. 3, output power of circuit 2 also increases with an increase in output voltage value VO of system power control circuit 2 by control of duty ratio D. If duty ratio D is controlled to make input voltage value VLD to VVVF inverter 6 maximum, then solar photovoltaic array 1 operates at a maximum power point. When output power of solar photovoltaic array 1 is balanced with required power of VVVF inverter 6, input voltage value VLD (=output voltage value VO) is Va (see FIG. 7). At that time, if the operating point of solar photovoltaic array 1 does not reach the maximum power point, then controller 20c carries out a tracking processing of the operating point to the maximum output point, and hence, input voltage value VLD further increases over Va. Thus, in such a case, as described above, duty ratio D is controlled so that input voltage value VLD is constant at a maximum input voltage value Vset so as to keep VVVF inverter 6 from an excess voltage supply (see FIG. 7).

Figure 12:
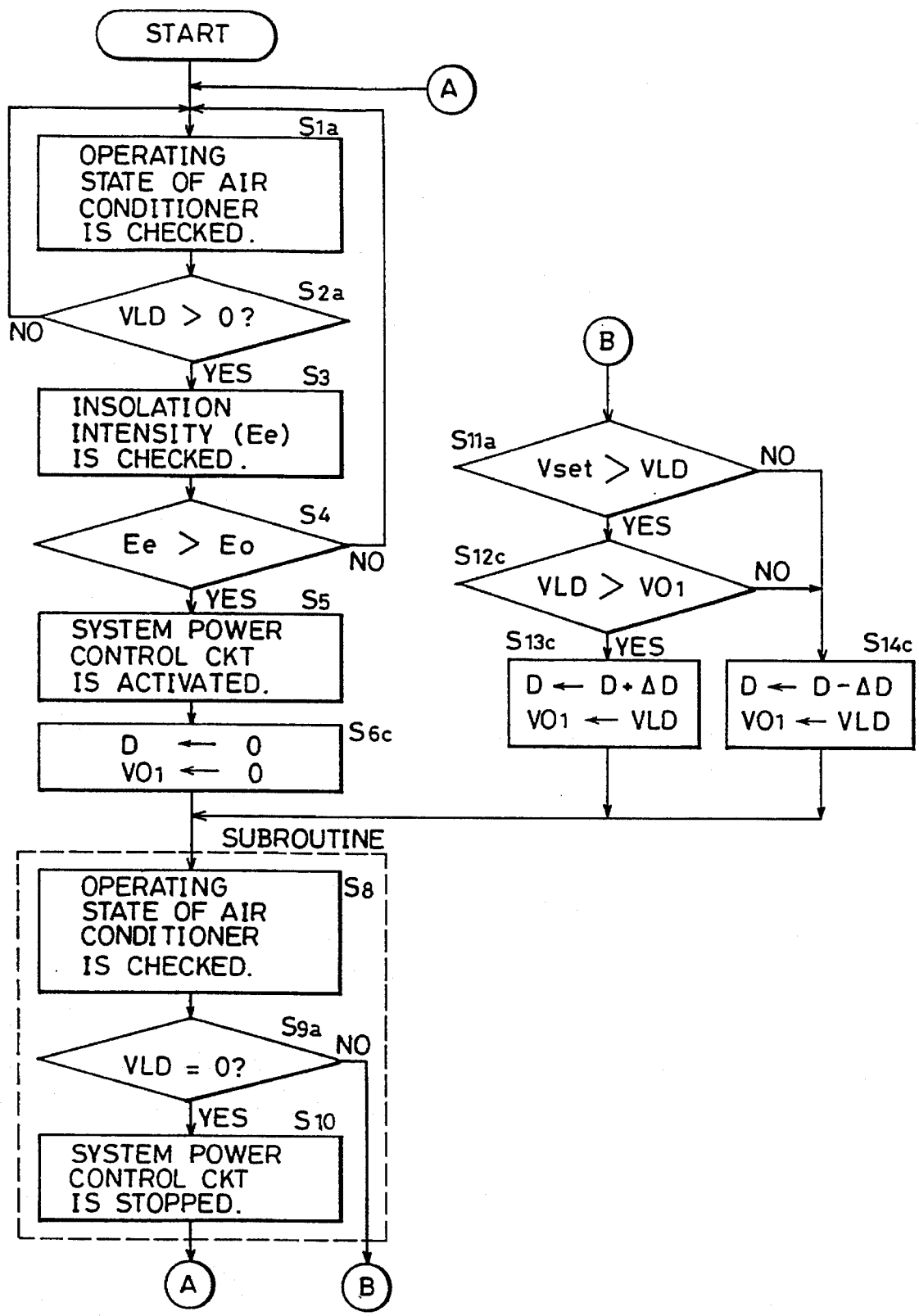
FIG. 12 is a schematic flow chart for use in explaining a drive control of a system power control circuit carried out in a controller of FIG. 11.
Figure 13:
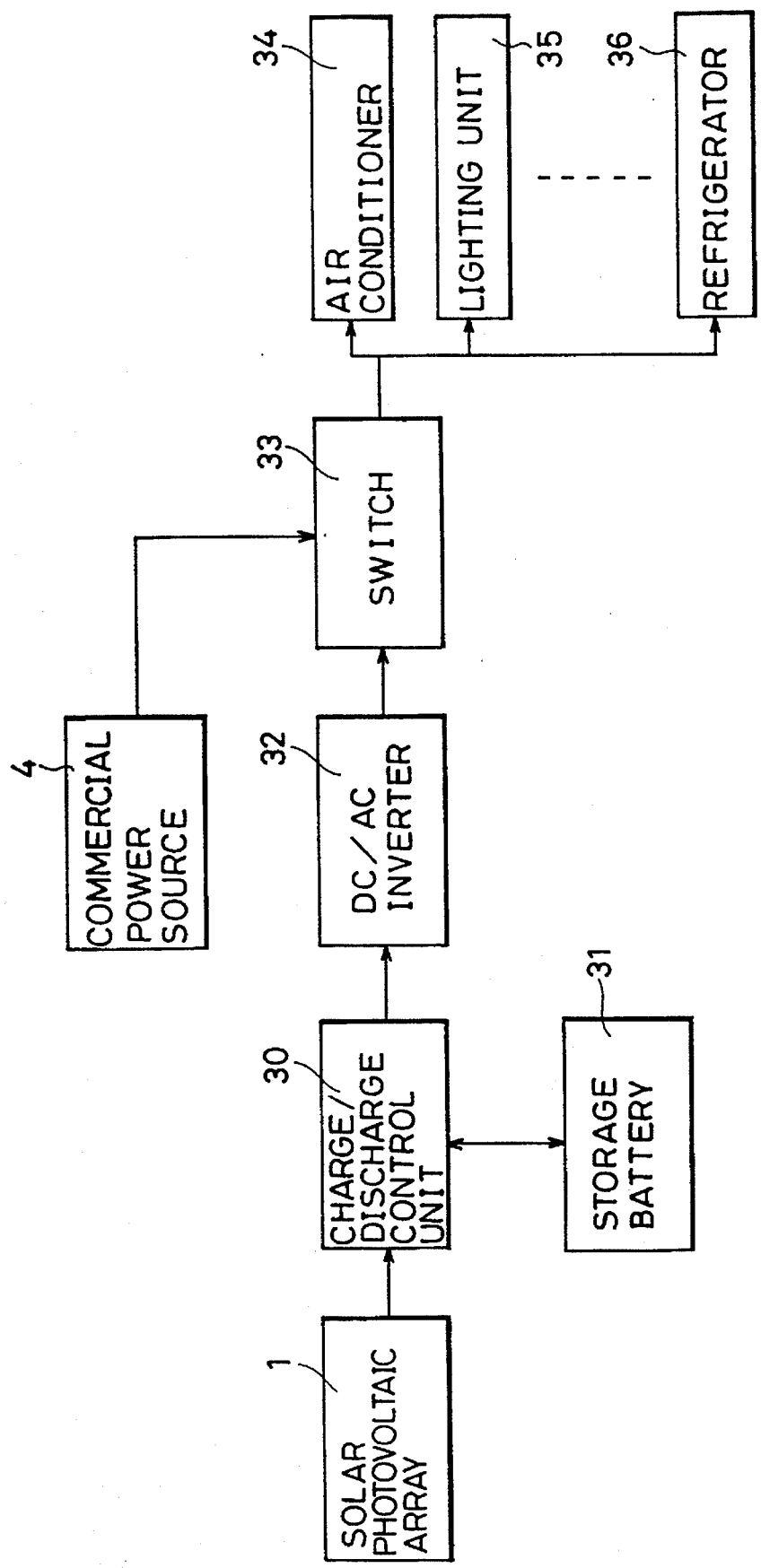
FIG. 13 is a schematic diagram showing structure of a conventional typical commercial power source-combined type solar photovoltaic cell utilization system.

FIG. 12 is a schematic flow chart for use in explaining a drive control of system power control circuit 2 carried out in controller 20c of FIG. 11.

In the flow chart of FIG. 12, step S7 in the flow chart of FIG. 8 is eliminated, and the respective processing in steps S6, S12, S13 and S14 are replaced with respective processing steps S6c, S12c, S13c and S14c, and the operating point of solar photovoltaic array 1 is regulated by using input voltage value VLD.

As shown in the flow chart of FIG. 12, controller 20c repetitively controls duty ratio D so that the operating point of solar photovoltaic array 1 tracks the maximum power point in accordance with input voltage value VLD to VVVF inverter 6. This regulation is carried out so that input voltage value VLD may not exceed maximum input voltage value Vset.

Since the operation of controller 20c according to the fourth embodiment merely substitutes processing in accordance with input voltage value VLD only for the processing in accordance with output current value IO in the operation of controller 20a according to the second embodiment, a description thereof is limited to the illustration of the flow chart (see FIG. 12).

As shown in the above-described first to fourth embodiments, during the period that air conditioner 34 is operating, each controller controls duty ratio D and controls the operating point of solar photovoltaic array 1 to track to the maximum power point while avoiding excessive power supply to air conditioner 34. Further, this tracking processing is carried out in accordance with a change in generating capacity of solar photovoltaic array 1 (a supply of light energy). Therefore, since the operating point of solar photovoltaic array 1 can be variably regulated in real time in accordance with a change in supply of light energy and a change in required power of air conditioner 34, it is unnecessary to provide a charge/discharge control circuit and a storage battery in order to inhibit output variations of solar photovoltaic array 1 (changes in supply of light energy). In addition, since output power of solar photovoltaic array 1 is directly supplied to air conditioner 34 without being DC/AC converted, power loss due to the conversion is prevented.

In the electric power supply system, the power source used in combination with commercial power source 4 is not limited to solar photovoltaic array 1.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic power supply system, comprising:

an inverter coupled to and supplying power to a load;

a first power source portion supplying power to said inverter;

a second power source portion used in combination with said first power source portion for supplying the inverter with any deficiency of power supplied to the inverter from said first power source portion, said second power source portion including an alternating current power source and a voltage multiplying rectifier circuit, and wherein said first power source portion includes a solar power source, a system power control circuit connected to said solar power source, a voltage detector for detecting and generating a first signal VLD corresponding to the value of an input voltage to said inverter and an insolation sensor for detecting and generating a second signal Ee corresponding to the value of the output voltage of the solar power source, said system power control circuit further comprising, a switching element and controller circuit means including a signal processor responsive to said first and second signals for controlling the on/off duty cycle ratio D of said switching element, said switching element controlling the voltage amplitude of said first signal so as to set a predetermined maximum value Vset thereof, and wherein an initial value of said duty cycle ratio D is stored in a memory of said signal processor and is variable in increments of ΔD, said increments further being initially set and stored in said memory, said signal processor duty cycle ratio D controlling the voltage amplitude of said first signal VLD such that VLD is decreased by said increments of ΔD when Vset>VLD and increased when Vset<VLD, whereby the solar source operates at a maximum power point.

2. The electric power supply system according to claim 1 wherein said solar power source comprises a solar photovoltaic array.

3. The electronic power supply system according to claim 1 wherein said signal processor generates a digital output signal of said duty ratio D.

4. The electronic power supply system according to claim 3 and additionally including a digital to analog converter coupled to said digital output signal from said microcomputer for generating an analog output signal of said digital output signal of said duty ratio D, a first waveform generating circuit having a predetermined operation cycle and generating a ramp type waveform signal, a second waveform generating circuit having a predetermined fixed frequency and generating a clock type signal, a comparator circuit coupled to said analog output signal and said ramp type waveform signal and generating a comparison output signal therefrom, a flip-flop circuit coupled to said clock type signal and generating a rectangular type output signal, and a digital logic gate circuit coupled to said comparison output signal and said rectangular type output signal and generating a signal for controlling the switching operation of said switching element.

5. The electronic power supply system according to claim 4 wherein said ramp type waveform signal comprises a sawtooth signal.

6. The electronic power supply system according to claim 3 wherein said signal processor comprises a stored program microcomputer.

7. The electronic power supply system according to claim 4 wherein said digital logic gate circuit comprises an AND gate.

8. The electronic power supply system according to claim 4 wherein said switching element comprises a semiconductor switching element.

9. The electronic power supply system according to claim 4 wherein said switching element comprises a MOSFET type switching element.

10. The electronic power supply system according to claim 1 wherein said signal processor means control a start and a stop operation of said system power control circuit in response to a predetermined value of said second signal Ee.

11. The electronic power supply system according to claim 1 wherein said signal processor controls a start operation of said power control circuit in response to said second signal Ee and having a value Ee>Eo, where Eo comprises a value stored in said memory necessary for activation of said system power control circuit and where VLD>0 indicates that said load is operating.

\* \* \* \* \*